US007360053B2

(12) United States Patent
Achanta et al.

(10) Patent No.: US 7,360,053 B2
(45) Date of Patent: Apr. 15, 2008

(54) FACILITATING NON-CONTIGUOUS ALLOCATION OF A LARGE OBJECT WITHIN A JAVA HEAP

(75) Inventors: Phani Gopal V. Achanta, Austin, TX (US); Robert Tod Dimpsey, Austin, TX (US); Harshal Hemendra Shah, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 10/948,276

(22) Filed: Sep. 23, 2004

(65) Prior Publication Data

US 2006/0064564 A1    Mar. 23, 2006

(51) Int. Cl.
G06F 12/00 (2006.01)
G06F 13/00 (2006.01)
G06F 13/28 (2006.01)

(52) U.S. Cl. .................................................. 711/171
(58) Field of Classification Search .................. 711/171
See application file for complete search history.

(56) References Cited

U.S. PATENT DOCUMENTS

| | | | | |
|---|---|---|---|---|
| 5,857,203 A | * | 1/1999 | Kauffman et al. | 707/200 |
| 6,061,678 A | | 5/2000 | Klein et al. | 707/3 |
| 6,070,173 A | * | 5/2000 | Huber et al. | 707/206 |
| 6,141,737 A | | 10/2000 | Krantz et al. | 711/171 |
| 6,144,970 A | | 11/2000 | Bonner et al. | 707/206 |
| 6,356,946 B1 | | 3/2002 | Clegg et al. | 709/231 |

OTHER PUBLICATIONS

Le Blanc, "Strategic Sourcing for Information Processing Functions", copyright 1993 ACM digital library, pp. 782-788.
Bonez et al., "MIL Primitives for Querying a Fragmented World", The VLDB Journal, copyright 1999, vol. 8, pp. 101-119.
Gottschalk, Technical Overview of IBM's Java Initiatives, copyright 1998 by International Business Machines Corporation, available at ftp://www6.software.ibm.com/software/developer/library/tech.pdf.

(Continued)

*Primary Examiner*—Matthew Kim
*Assistant Examiner*—Edward J Dudek
(74) *Attorney, Agent, or Firm*—Herman Rodriguez; Amy J. Pattillo (57) ABSTRACT

A method, system, and program for facilitating non-contiguous allocation of a chunked object within a Java heap without changing the manner in which a Java Virtual Manager allocates objects within the heap are provided. According to one embodiment, a chunking controller within a broker layer detects a large object, where a large object is one that the size of the allocation of the large object within a memory heap exceeds a maximum contiguous free space within the Java heap. The broker layer operates atop the Java Virtual Manager to facilitate communication and business processes between heterogeneous systems. The chunking controller describes the large object by an underlying array of the large object divided into multiple pieces of a size not exceeding the maximum contiguous free space. Then, the chunking controller enables requests through the broker layer for allocation by the Java Virtual Manager of each of the pieces of the large object within the Java heap, such that the broker layer facilitates efficient allocation of large objects in the Java heap managed by the Java Virtual Manager.

8 Claims, 4 Drawing Sheets

OTHER PUBLICATIONS

Blasch et al, Summary of article titled "Cognitive-based fusion using information sets for moving target recognition", copyright 2000, INSPEC.

IBM Websphere InterChange Server, Technical Introduction to IBM WebSphere InterChange Server, copyright Dec. 19, 2003 by International Business Machines Corporation, available at ftp://ftp.software.ibm.com/software/websphere/integration/wicserver/library/doc/wics422/pdf/technical_introduction.pdf.

Arora et al, Introduction to Websphere InterChange Server v4.2.2 Performance Tuning, copyright 2004 by International Business Machines Corporation, available at http://www.redbooks.ibm.com/redpapers/pdfs/redp9124.pdf.

U.S. Appl. No. 10/862,151, filed Jun. 4, 2004, Blandy.

U.S. Appl. No. 10/862,137, filed Jun. 4, 2004, Blandy.

U.S. Appl. No. 10/862,138, filed Jun. 4, 2004, Blandy.

* cited by examiner

FACILITATING NON-CONTIGUOUS ALLOCATION OF A LARGE OBJECT WITHIN A JAVA HEAP

BACKGROUND OF THE INVENTION

1. Technical Field

The present invention relates in general to improved heap management and, in particular, to improved efficiency of allocation of a large object within a heap. Still more particularly, the present invention relates to facilitating efficient non-contiguous allocation of a large object which is too large to fit within a contiguous free space within a Java heap by chunking the large object into multiple pieces at a broker layer.

2. Description of the Related Art

The Internet provides protocols that support one layer of connectivity between multiple computer systems distributed across multiple networks. However, while the Internet supports one layer of connectivity, to connect the many diverse platforms operating via the Internet, additional layers of connectivity are required. In particular, to increase business productivity, many companies now face the problem of enabling additional layers of connectivity so that heterogeneous and geographically distributed systems can communicate. On another level, companies face the problem of supporting both information and processes across an enterprise's network of diverse systems and technologies.

One solution to the problem of supporting distribution of information and processes across diverse systems is through the implementation of a hub and spoke type of infrastructure. In a hub and spoke infrastructure, a broker or other central infrastructure acts as a hub for straddling existing and new diverse systems and technologies to unite dissimilar data sources and applications.

In general, in a hub and spoke infrastructure, the hub receives data from many spokes, distributes the data among processes executing within the hub, and then returns the results to the spokes. The hub includes adapters that enable the hub to communicate with spokes implementing a diversity of protocols and data types. The adapters in the hub may translate, map, or reformat data so that the processes within the hub can understand the data received from the spokes. The hub includes multiple business processes to which the adapters pass data for processing. Once the business process complete execution, the hub may translate the resulting data so that the spoke receiving a result can understand the data.

In one example, the components within the hub that perform the receiving, the distributing, and the returning may be written in Java (Java is a registered trademark of Sun Microsystems, Inc. in the United States and other countries). Java based components interact with a Java Virtual Machine (JVM) (JVM is a registered trademark of Sun Microsystems, Inc. in the United States and other countries), which acts as the operating system for Java based applications. The Java Virtual Machine (JVM) runs atop the native operating system of the server or other computer system. The JVM accesses memory through the native operating system, and, in particular, requests the allocation of a Java heap, which is a contiguous portion of memory dedicated for use by the JVM. The JVM then receives allocation requests from the Java based components of the hub and controls allocation of the objects within the Java heap.

A common problem with JVM performance is that the JVM must locate a contiguous free space within the Java heap to allocate an object; if the JVM cannot locate a contiguous free space of sufficient size, then an Out of Memory error is returned to the Java component. This problem of locating contiguous free space of sufficient size in the Java heap increases as the size of allocation requests increases. In particular, as the JVM allocates and then deallocates objects within the Java heap, the free space in the Java heap becomes fragmented over time, leading to the return of Out of Memory errors even when the total free space in the Java heap is large enough for an object allocation, because there is no contiguous free space large enough for a particular object allocation. For example, because of fragmentation, a Java heap may include 100 MB total of free space, however, the largest contiguous free space is only 1 MB, leading to the return of an Out of Memory error when the JVM attempts to allocate an object greater than 1 MB.

Because of the problem with the JVM returning Out of Memory errors when sufficient contiguous free space is not available for an allocation, a common problem within a Java component based hub, such as the IBM WebSphere Interchange Server (IBM and WebSphere are registered trademarks of International Business Machines Corporation), is that as the Java heap becomes fragmented, any data object passing through the hub that exceeds the size of the largest average free space within the Java heap, will cause the hub to stall. In particular, within the hub and spoke architecture implemented through the IBM WebSphere Interchange Server, it is common for the hub and spokes to pass batches of data in the form of a data entity, known as a business object. Business objects may include arrays of data formatted to match a business object definition known by the hub and a spoke. Business objects that include the data needed for batch process handling may grow large as the data is accumulated at the spoke into a business object. In addition, as each Java component within the hub handles a business object, each Java component may request additional allocations of the business object from the JVM within the Java heap and may increase the size of the business object during translations or clone multiple copies of the business object for distribution to multiple business processes within the hub. Thus, for example, a business object pulled off the transport layer of the hub that appears 10 MB in size may result in the allocation of many larger Java objects in the Java heap, such as allocations of 30 MB of contiguous space in the Java heap, as the business object flows through the Java components of the hub. In the example, if the JVM is unable to locate more than 10 MB of free space on the Java heap on average, then the JVM will return an Out of Error message that stalls the first Java component requesting allocation of the business object as a Java object within the Java heap. Thus, Out of Error messages received by Java components within the hub are a problem because the Out of Error messages delay the hub's handling of business objects and indicate the hub's inability to handle business transactions requiring transfers of batches of data larger than a typical maximum contiguous free space size.

Both the JVM and the Java components within a hub may include tuning parameters to aid a network administrator in reducing the frequency at which Out of Memory errors occur; however, adjustment of these tuning parameters only effectively adjusts the average maximum size of contiguous free space within the JVM and does not solve the problem of how to handle business objects larger than the maximum contiguous free space when the total available free space is still greater than the size of the business object. For example, a hub administrator may increase the size of the Java heap in an attempt to reduce the frequency at which Out of Memory errors occur because more total heap space is available, however each operating system on top of which the JVM runs limits the maximum Java heap size and increasing the Java heap size does not change the resulting fragmentation of free space within the Java heap. In another example, a hub administrator may set the rate at which business objects can flow through the Java components of the hub to reduce the number of business objects concurrently allocated in the Java heap, however, setting the flow rate of a business object through the hub does not change the fact that the JVM may not be able to locate sufficient contiguous free space within the Java heap for allocation of a business object exceeding the maximum contiguous free space.

Therefore, in view of the foregoing, there is a need for a method, system, and program for enabling a Java based broker that facilitates distribution of data entities to business processes to efficiently allocate data entities, such as business objects, exceeding the maximum contiguous free space available in the Java heap, particularly when the total free space available in the Java heap exceeds the size of the data entity. In particular, it would be advantageous to provide a method, system, and program for enabling allocation of large objects among non-contiguous free spaces to reduce fragmentation of the Java heap, without changing the manner in which the JVM allocates objects and in a manner that is transparent to the spokes and to other Java components within the hub.

SUMMARY OF THE INVENTION

Therefore, an improved method, system, and program provide improved heap management and, in particular, provide for improved efficiency of allocation of large objects within a heap. Still more particularly, the present invention facilitates efficient non-contiguous allocation of a large object which is too large to fit within a contiguous free space within a Java heap by chunking the large object into multiple pieces at a broker layer.

According to one embodiment, a chunking controller within a broker layer detects a large object, wherein a large object is one that the size of the allocation of the large object within a memory heap exceeds a maximum contiguous free space within the memory heap. The chunking controller describes the large object by an underlying array of the large object divided into multiple pieces of a size not exceeding the maximum contiguous free space. Then, the chunking controller enables requests through the broker layer for allocation by the virtual manager layer of each of the pieces of the large object within the memory heap, such that the broker layer facilitates efficient allocation of large objects in the memory heap managed by the virtual manager layer.

Architecturally, the broker layer operates atop the virtual manager layer that interfaces with the operating system to manage allocation within the memory heap. The virtual manager layer only completes allocation requests when a contiguous free space within the heap of sufficient size to meet the allocation request is available.

The broker layer includes multiple Java components that interface with a Java virtual manager that manages a Java heap. As business objects pass between the Java components, the chunking controller detects whether the business objects are large objects and thus in need of chunking. As business objects chunked into an underlying array pass between the Java components that perform operations on the business objects, chunking controller updates the underlying array to reflect the current allocation of the business object within the Java heap.

The broker layer may operate within a hub system of a hub and spoke infrastructure. The broker layer receives business objects a spoke, processes the business object, and returns a result to the same or a different spoke. When the chunking controller detects the broker layer preparing a large object for transport to a spoke, the chunking controller directs retrieval of the multiple pieces of the large object from the memory heap and complies the multiple pieces of the large object into a buffer according to the underlying array description, such that the large object is transported to the spoke as a single, unchunked data entity.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
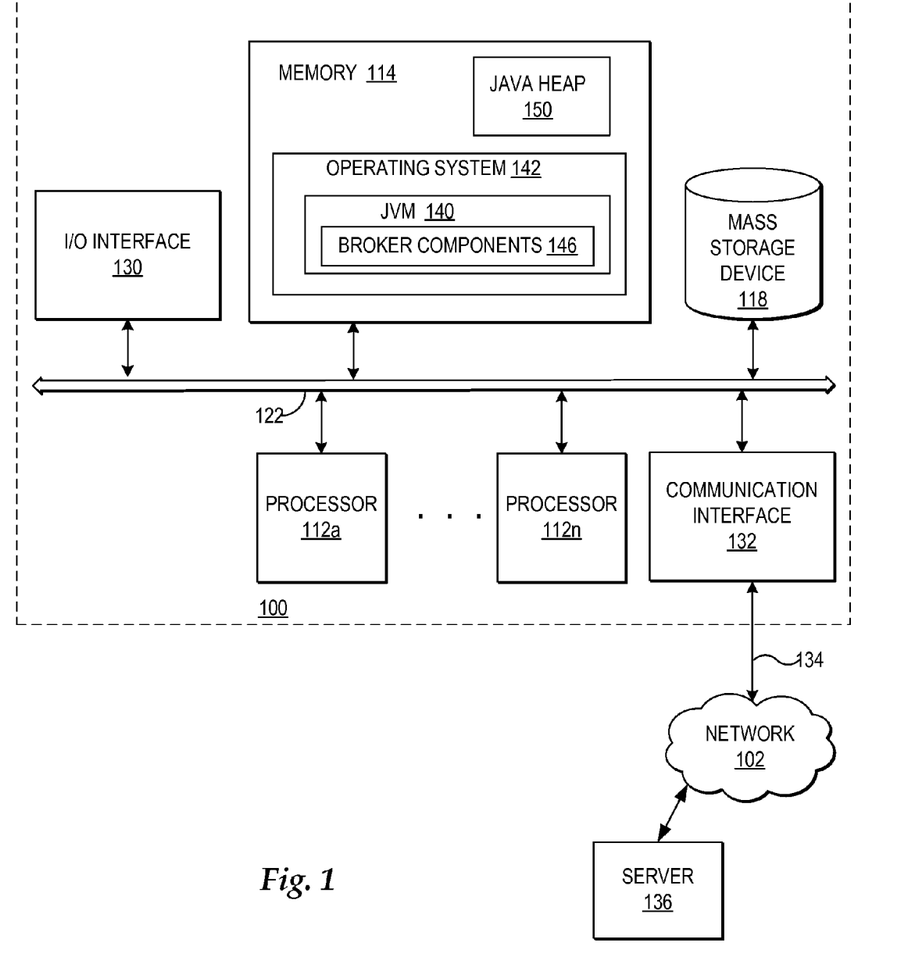
FIG. 1 is a block diagram depicting one embodiment of the hardware and software implemented in a computer system through which the present method, system, and program may be implemented.

Referring now to the drawings and in particular to FIG. 1, there is depicted one embodiment of the hardware and software implemented in a computer system through which the present method, system, and program may be implemented. The present invention may be executed in a variety of systems, including a variety of computing systems and electronic devices.

Computer system 100 generally includes a bus 122 or other communication device for communicating information within computer system 100, and at least one processing device, such as processor 112a, coupled to bus 122 for processing information. Bus 122 preferably includes low-latency and higher latency paths connected by bridges and adapters and controlled within computer system 100 by multiple bus controllers. When implemented as a server system, computer system 100 typically includes multiple processors, such as processors 112a-112n, that operate in parallel to improve network servicing power.

Processors 112a-112n maybe general-purpose or specified purpose processors that, during normal operation, operate under the control of one or more of a number of different operating systems, such as operating system 142, and execute various computer software applications, programs, objects, modules and other processes from a memory 114.

Although not depicted, memory 114 may include dynamic storage such as random access memory (RAM) and static storage such as Read Only Memory (ROM). In addition, although not depicted, each of processors 112*a*-112*n* may include levels of cache and registers local to a central processing unit.

In one embodiment, processors 112*a*-112*n* load a Java Virtual Machine (JVM) 140 in memory 114 on top of operating system 142. JVM 140 appears as an application to (native) operating system 142, but in fact functions as a virtual operating system, supporting Java application and Java components. In particular, Java components are preferably portable applications that when run by JVM 140, can run on any platform, regardless of operating system or hardware specifications. Although not depicted, JVM 140 compiles byte code from Java components and a Java interpreter converts the byte code into instructions understandable by operating system 142. The components of JVM 140 may be incorporated into a standalone application, a part of an operating system, or a part of a larger application, such as a browser application or middleware. In an alternate embodiment, JVM 140 and any of the components of JVM 140 may, at different times, reside in whole or in part in any of memory 114, mass storage device 118, network 102, or within registers or cache of processors 112*a*-112*n* or other processor registers and cache.

JVM 140 requests that OS 142 allocation a portion of memory 114 to a Java heap 150. In particular, Java heap 150 is a contiguous memory space into which only JVM 140 may allocate Java objects. JVM 140 tracks the free spaces within Java heap 150 and may periodically perform a garbage collection procedure to free Java heap 150 of Java objects no longer needed. In one embodiment, JVM 140 only satisfies an allocation request if a contiguous free space of sufficient size is available for the allocation request. In another embodiment, JVM 140 may break an allocation request into multiple pieces and allocate each piece within a contiguous free space; JVM 140 must then manage the compilation of the Java object any time JVM 140 needs to access the Java object.

In one embodiment, broker components 146 include Java components that provide the application infrastructure for computer system 100 to function as a broker system. Generally, broker components 146 may include Java components that support the distribution of data entities to processes. In particular, as will be further described, broker components 146 may include Java components that support the implementation of a hub and spoke type infrastructure. In a hub and spoke infrastructure, broker components 146 function to provide a hub for straddling existing and new diverse systems and technologies to unite dissimilar data sources and applications. One example of computer system 100 executing broker components 146 is an IBM WebSphere Interchange Server. In addition, as will be further described, when computer system 100 functions as a spoke, computer system 100 may include JVM 140 with spoke components that enable connectivity with the hub. Advantageously, in supporting the distribution of data entities to processes, broker components 146 enable efficient allocation of data entities of a size that exceeds the maximum contiguous free space available in Java heap 150, but does not exceed the total available free space available in the Java heap 150.

Figure 5:
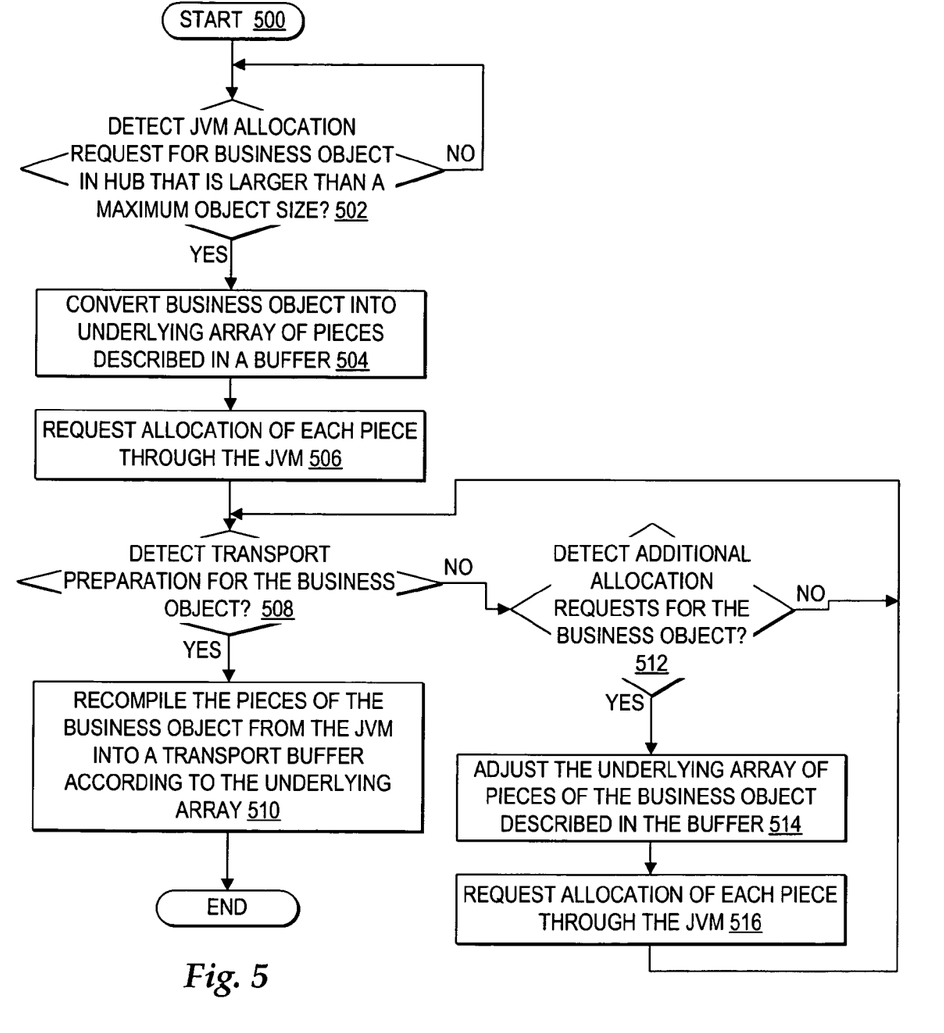
FIG. 5 is a a high level logic flowchart depicting a process and program for controlling efficient allocation of large business objects in a hub in accordance with the method, system, and program of the present invention.

In one embodiment, operating system software 142, JVM 140, or broker components 146 contains machine executable instructions, that when executed on processor 112, carry out the operations depicted in the flowchart of FIG. 5, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processors 112*a*-112*n* or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 is an example of a non-volatile medium, depicted as an internal component of computer system 100, but it will be understood an external device may also provide mass storage device 118. Volatile media include dynamic memory such as RAM. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein a remote system, such as server 136, may transfer the program instructions to requesting computer system 100 by way of data signals embodied in a carrier wave or other propagation medium via a network link 134 (e.g. a modem or network connection) to a communications interface 132 coupled to bus 122. Communications interface 132 provides a data communications coupling to network link 134 that may connect, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

In addition to server 136, network 102 may provide access to any number of computers and other devices. Further, operating system 142, JVM 140, and various applications, programs, objects, modules and other processes may execute on one or more processors in server 136 and other computer systems accessible via network 102 in a distributed environment. In particular, when implemented as a server system, computer system 100 typically includes multiple communication interfaces accessible via multiple peripheral component interconnect (PCI) bus bridges connected to an input/output controller. In this manner, computer system 100 allows connections to multiple networked accessible computers.

In addition, computer system 100 typically includes multiple peripheral components that facilitate communication. These peripheral components are connected to multiple controllers, adapters, and expansion slots coupled to one of the multiple levels of bus 122 and herein referred to by I/O interface 130.

Those of ordinary skill in the art will appreciate multiple types of systems may implement the hardware depicted in FIG. 1 and that the hardware depicted in FIG. 1 may vary. For example, computer 100 include a standard computer or server, but can also include an embedded system, such as a set top box, handheld device, or any other hardware device including a processor and JVM 140. Furthermore, those of ordinary skill in the art will appreciate that the depicted example is not meant to imply architectural limitations with respect to the present invention.

Figure 2:
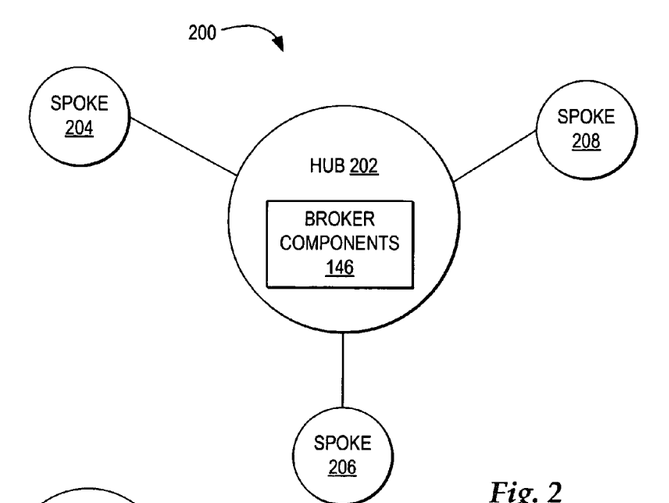
FIG. 2 is a block diagram illustrating a hub and spoke infrastructure in accordance with the method, system, and program of the present invention.

With reference now to FIG. 2, there is depicted a block diagram illustrating a hub and spoke infrastructure in accordance with the method, system, and program of the present invention. As illustrated, a hub and spoke infrastructure 200 includes a hub 202 and multiple spokes 204, 206 and 208. In particular, a system including broker components 146 facilitates hub 202 for management of business processes and communications between the systems characterized as spokes 204, 206, and 208. Spokes 204, 206, and 208 may also include broker components. In addition, it will be understood that spokes 204, 206, and 208 are depicted for purposes of illustration and not as a limitation on the number of spokes or the organization of spokes.

Hub 202 and spokes 204, 206, and 208 may include heterogeneous or homogeneous systems accessible within an intranet, via the Internet, or within another network environment. Each of spokes 204, 206, and 208 may perform as client systems or server systems that implement different communication platforms. For example, any of spokes 204, 206, and 208 may implement browsers that support Hypertext Markup Language (HTML) and eXtensible Markup Language (XML) or may include applets and Java applications that request and receive information from hub 202. Further, hub 202 and spokes 204, 206, and 208 may include, for example, web servers, application servers, and servers that implement servlets, JSPs, Enterprise Java Beans (EJBs), Java Message Service (JMS), Java Naming and Directory Interface (JNDI), Common Object Request Broker Architecture (CORBA), and Customer Information Control Systems (CICSs), for example. In addition, spokes 204, 206, and 208 may include backend systems that provide databases, web services, and other resources, through Java Database Connectivity (JDBC), for example.

Communication channels are established between hub 202 and spokes 204, 206, and 208. For example, communication channels may implement adapters that enable communications in Hypertext Transfer Protocol (HTTP), Internet Inter-orb Protocol (IIOP), Remote Method Invocation (RMI), Simple Object Access Protocol (SOAP), and a Secure Socket Layer (SSL) and may include a firewall or other security layer. In addition, adapters may include connectors, queues, and other interfaces that enable communication.

Figure 3:
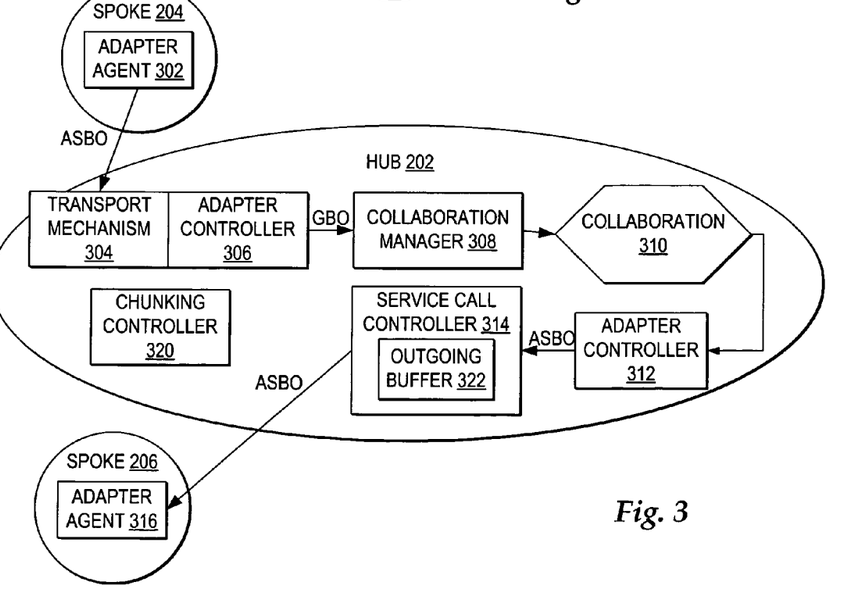
FIG. 3 is a block diagram depicting the components of a broker in accordance with the method, system, and program of the present invention.

Referring now to FIG. 3, there is depicted a block diagram of the components of a broker in accordance with the method, system, and program of the present invention. For purposes of example, the components of hub 202 and spokes 204 and 206 are illustrated, where data is exchanged between hub 202 and spokes 204 and 206 and data is passed through hub 202 in the form of business objects. It will be understood that the components illustrated in hub 202 and spokes 204 and 206 are merely for purposes of illustration and are not intended as structural limitations of a broker system implementing the present invention.

In the example, spoke 204 includes an adapter agent 302 that accumulates data into an application specific business object (ASBO) defined by a specific application and controls placement of the ASBO to transport mechanism 304 of hub 202. For example, spoke 204 may include an SAP based application (SAP is a registered trademark of SAP AG in Germany and in several other countries), such that adapter agent 302 accumulates SAP defined data into an SAP ASBO.

While in the example hub 202 only receives an ASBO from spoke 204, practically, hub 202 may receive many ASBOs from many spokes within a short period of time. Thus, hub 202 requires a transport mechanism 304 that receives multiple types of data from multiple sources and queues the data until it is pulled off the queue by adapter controllers within hub 202. In one example, transport mechanism 304 implements IBM WebSphere MQSeries (MQSeries is a registered trademark of International Business Machines Corporation) to perform queuing and distribution.

In particular, a thread within transport mechanism 304 will pull ASBOs off the queue in transport mechanism 304 and distribute the ASBO to an adapter controller of a type that corresponds with the adapter agent. In the example, adapter controller 306 corresponds to adapter agent 302, and thus the ASBO is pulled off transport mechanism 304 and placed with adapter controller 306. Although not depicted, adapter controller 306 may include a queue into which transport mechanism 304 places ASBOs of the type handled by adapter controller 306. Then, one of multiple threads associated with adapter controller 306 may pick the ASBO off adapter controller 306 and map the ASBO to a generic business object (GBO) understood by the collaborations available in hub 202.

Adapter controller 306 passes the mapped GBO to collaboration manager 308, where collaboration manager 308 controls the distribution of the GBO to a collaboration 310 that performs a particular business process or transaction with the GBO. It will be understood that adapter controller 306 may pass the mapped GBO to multiple collaboration managers that control different types of collaborations and that each collaboration manager may clone a GBO and pass the GBO to multiple collaborations of the same type.

Once collaboration 310 completes processing of the GBO, collaboration 310 calls an adapter controller for the destination location. In the example, collaboration 310 calls adapter controller 312. Adapter controller 312 maps the GBO into an ASBO of a type understood by an adapter agent 316 at spoke 306. Then, a service call controller 314 places a call to adapter agent 316 and passes the ASBO to adapter agent 316 when adapter agent 316 indicates readiness. In one embodiment, logically, service call controller 314 is part of transport mechanism 304 that facilitates the sending of business objects. Service call controller 314 may include an outgoing buffer 322 for holding outgoing business objects retrieved from the Java heap.

In the example, each of transport mechanism 304, adapter controller 306 and collaboration manager 308 may be Java components that interact with JVM 140 to request allocation of the business object as a Java object within Java heap 150.

In particular, in the example, when a transport mechanism thread pulls the ASBO off of the queue within transport mechanism 304, the thread requires allocation of the ASBO within the JVM as a Java object. Then, when the adapter thread within adapter controller 306 maps the ASBO to a GBO, the required allocation space of the Java object for the GBO within Java heap 150 grows. Further, a thread within collaboration manager 308 may require allocation of additional copies of the GBO by JVM 140 within Java heap 150 for each collaboration.

According to an advantage of the invention, when a business object already exceeds a maximum free space size or is anticipated to exceed a maximum free space size, a chunk controller 320 may chunk the business object into multiple underlying pieces and request allocation of each of the underlying pieces individually by JVM 140. By requesting allocation of each of the underlying pieces individually by the JVM 140, rather than in one allocation, JVM 140 only needs to locate sufficient contiguous free space for each piece individually, rather than sufficient contiguous free space for the entire business object. Importantly, the manner in which JVM 140 allocates objects is not changed, just the size and number of allocation requests for objects is adjusted by chunk controller 320 at the broker component layer. It is important to note that while chunk controller 320 is depicted as an independent component within hub 202 that can monitor a business object at any point within hub 202, chunk controller 320 may also be incorporated within a particular component of hub 202.

Chunk controller 320 describes the underlying pieces of the chunked business object in an array or list of the pieces associated with the business object. Thus, as the business object is passed between components of hub 202, the components view the business object as a single data entity and the business object is passed to spoke 306 as a single data entity, however, the business object is viewed by the JVM as pieces. As each components of hub 202 manipulates the business object, choke controller 320 may adjust the array describing the underlying pieces of the business object to reflect additional allocations. Then, when chunk controller 320 detects service call controller 314 receiving a business object for transport, chunk controller 320 directs service call controller 314 to request retrieval of each of the underlying pieces of the business object described in the chunk array from the JVM heap and combine the pieces in the outgoing business object queue according to the map of the business object in the chunk array. Thus, the division of the business object into multiple pieces allocated within Java heap 150 is transparent to spokes 204 and 206.

Figure 4:
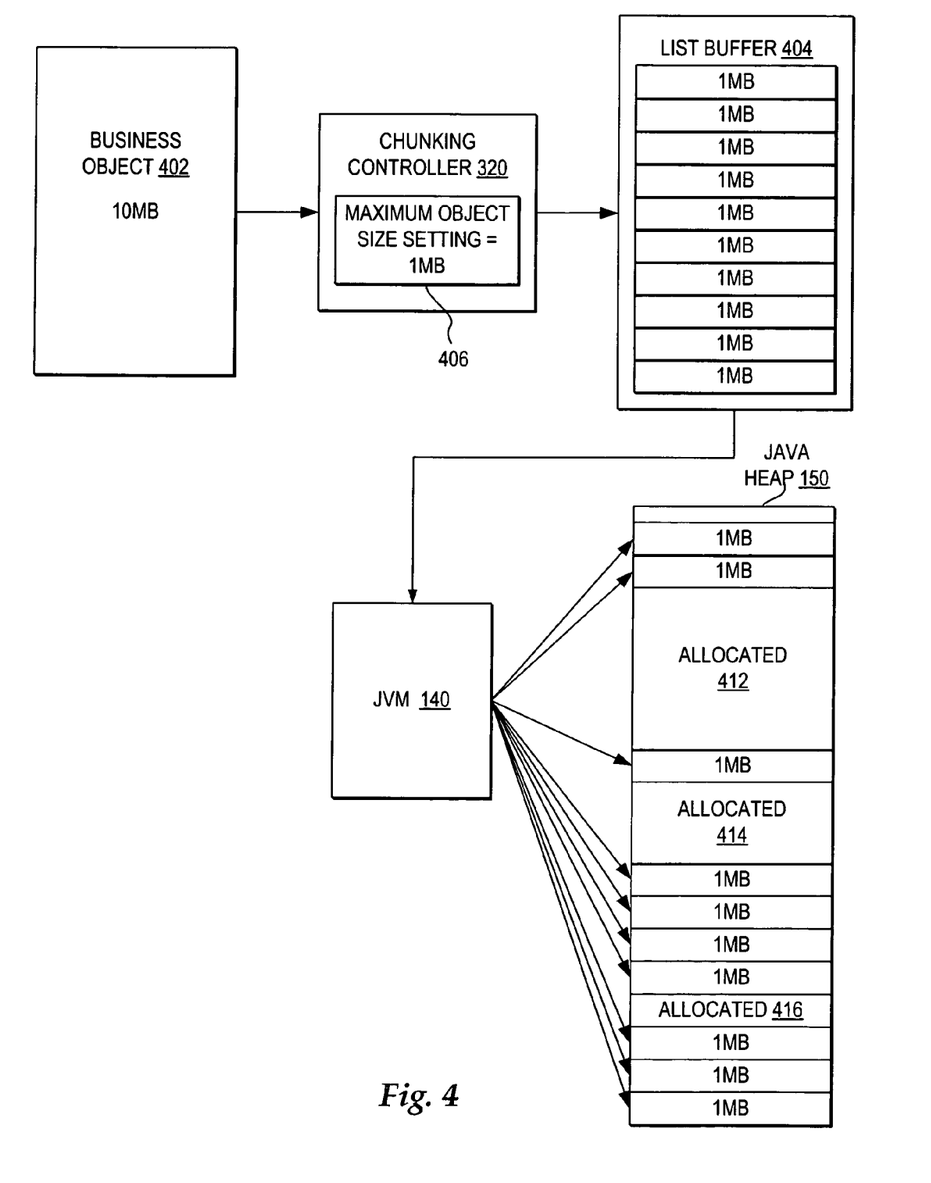
FIG. 4 is a block diagram depicting an illustrative example of the progression of a chunked business object in accordance with the method, system, and program of the present invention.

With reference now to FIG. 4, there is depicted an illustrative example of the progression of a chunked business object in accordance with the method, system, and program of the present invention. As depicted, a business object 402 is 10 MB in size. A maximum object size setting 406 within chunking controller 320 is set to a maximum object size of 1 MB. Thus, chunking controller 320 will detect that business object 402 exceeds the maximum object size and initiate chunking business object 402 and requesting allocation of the individual pieces of the chunked business object 402 by JVM 140.

In the example, chunking controller 320 chunks business object 402 into ten 1 MB pieces described by a chunked list. In particular, the underlying pieces of business object 402 described by the chunked list are demonstratively illustrated within a list buffer 404. It will be understood that the pieces of business object 402 may also be described in an array or other data structure that is able to describe the underlying pieces of business object 402. In addition, although not depicted, list buffer 404 maintains a reference to the allocation locations of each of the pieces within Java heap 140.

Chunking controller 320 then directs an allocation request to be submitted to JVM 140 for each of the underlying pieces illustrated in list buffer 404. JVM 140 may then control allocation of each of the 1 MB pieces within 1 MB contiguous free spaces within Java heap 150. In the example, allocated spaces 412, 414, and 416 are not free space within Java heap 150; the 1 MB pieces are allocated within the free spaces surrounding allocates spaces 412, 414, and 416 within Java heap 150.

As hub 202 passes business object 402 from one component within hub 202 to another, the chunked list illustrated by list buffer 404 may be passed from component to component or may be maintained within a single buffer location. It will be understood that each component may manipulate business object 402, requiring adjustment to list buffer 404 as new allocation requests are required. Further, it will be understood that chunking controller 320 may initiate chunking of business object 402 at any component within the hub when the size of the free space needed for allocation of business object 402 exceeds maximum object size setting 406.

An administrator may adjust the value of maximum object size setting 406. Alternatively, chunking controller 320 may automatically set the value of maximum object size setting 406 according to the current contiguous free space available in Java heap 150. In addition, other methods of setting maximum object size setting 406 may be implemented.

In the present example, chunking controller 320 divides business object 402 into pieces of a uniform size equal to maximum object size setting 406. In alternate embodiments, however, chunking controller 320 may divide business object 402 into pieces of a size different than maximum object size setting 406 and may divide business object 402 into pieces of different sizes.

Referring now to FIG. 5, there is depicted a high level logic flowchart of a process and program for controlling efficient allocation of large business objects in a hub in accordance with the method, system, and program of the present invention. As depicted, the process starts at block 500 and thereafter proceeds to block 502. Block 502 depicts a determination whether a chunk controller detects a JVM allocation request for a business object in the hub where the allocation request size is larger than a maximum object size. If the chunk controller detects a JVM allocation request size larger than a maximum object size, then the process passes to block 504. Block 504 depicts converting a business object into an underlying array of pieces described in a buffer. Next, block 506 depicts requesting allocation of each piece from the JVM. Thereafter, block 508 depicts a determination whether the chunking controller detects transport preparation for the business object. If the chunking controller does not detect transport preparation for the business object, then the process passes to block 512. If the chunking controller does detect transport preparation for the business object, then the process passes to block 510. Block 510 depicts recompiling the pieces of the business object from the JVM into a transport buffer according to the underlying array for transporting the business object from the hub, and the process ends.

Block 512 depicts a determination whether the chunking controller detects additional allocation requests for the business object as it passes through additional Java components within the broker layer. If no additional requests are detected, then the process returns block 508. If an additional allocation request is detected, then the process passes to block 514. Block 514 depicts adjusting the underlying array of pieces of the business object described in the buffer. Next, block 516 depicts requesting allocation of each piece through the JVM, and the process returns to block 508. Alternatively, the additional allocation requests may just request allocation of those pieces adjusted by the Java component.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for facilitating efficient allocation of large objects in a memory heap, comprising:
   detecting a large object within a broker layer handling said large object, wherein a size required for allocation of said large object within a memory heap exceeds a maximum contiguous free space within said memory heap, wherein said broker layer operates on top of a virtual manager layer that manages allocations within said memory heap;
   describing, by said broker layer, said large object by an underlying array of said large object divided into a plurality of pieces of a size not exceeding said maximum contiguous free space;
   requesting, by said broker layer, allocation by said virtual manager layer of each of said plurality of pieces within said memory heap;
   passing said large object within said broker layer between a plurality of components wherein at least one of said plurality of components requires additional allocation space for said large object, wherein said plurality of components view said large object as a single data entity and said virtual manager layer views said large object as said plurality of pieces;
   detecting by said broker layer an allocation request for said additional allocation space for said large object from one of said plurality of components to said virtual manager layer; and
   adjusting by said broker layer said underlying array to reflect said allocation request for said large object.

2. The computer-implemented method according to claim 1 for facilitating efficient allocation of large objects in a memory heap, wherein detecting a large object within a broker layer handling said large object, further comprises:
   detecting said large object at a point within said broker layer comprising at least one from among said large object pulled off a transport mechanism for said broker layer, said large object mapped into a generic object, and said large object cloned for distribution to processes within said broker layer.

3. The computer-implemented method according to claim 1 for facilitating efficient allocation of large objects in a memory heap, wherein said virtual manager layer only completes an allocation request if a contiguous free space within said memory heap of sufficient size for said allocation request is available.

4. The computer-implemented method according to claim 1 for facilitating efficient allocation of large objects in a memory heap, further comprising:
   detecting said broker layer preparing said large object for transport to a spoke;
   retrieving said plurality of pieces of said large object from said memory heap through a request to said virtual manager layer; and
   compiling said plurality of pieces back into said large object in a buffer according to said underlying array description, wherein said large object is transported as a single data entity.

5. The computer-implemented method according to claim 1 for facilitating efficient allocation of large objects in a memory heap, wherein said large object is a data entity.

6. The computer-implemented method according to claim 1 for facilitating efficient allocation of large objects in a memory heap, wherein said broker layer operates within a hub system that enables communication between a plurality of heterogeneous spoke systems by receiving and distributing communications in a plurality of protocols.

7. The computer-implemented method according to claim 1 for facilitating efficient allocation of large objects in a memory heap, wherein said broker layer comprises a plurality of components and said virtual manager layer is a virtual manager that manages said memory heap as a heap of contiguous memory.

8. The computer-implemented method according to claim 1 for facilitating efficient allocation of large objects in a memory heap, further comprising:
   receiving a plurality of application specific objects each defined by a particular application from among a plurality of applications into a queue of a transport mechanism of said broker layer;
   responsive to a thread pulling a next application specific object off said queue, detecting by said broker layer whether said next application specific object is said large object and distributing, by said thread, said next application specific object to a particular adapter controller of a type for handling a type of application of said next application specific object from among a plurality of adapter controllers, wherein said plurality of components comprises said plurality of adapter controllers;
   mapping, by an adapter thread of said particular adapter controller, said next specific object into a general business object and requesting, by said adapter thread an additional allocation request for additional allocation space to said large object for said general business object to said virtual manager layer;
   passing said general business object to a collaboration manager for controlling distribution of said general business object to at least one collaboration, wherein said plurality of components comprises said collaboration manager; and
   requesting, by said collaboration manager, a next allocation request for additional allocation space to said large object for at least one copy of said general business object to said virtual manager layer.

* * * * *